United States Patent
Huang et al.

(10) Patent No.: US 9,933,815 B2
(45) Date of Patent: Apr. 3, 2018

(54) ELECTRONIC DEVICE

(71) Applicant: Acer Incorporated, New Taipei (TW)

(72) Inventors: Yu-Chin Huang, New Taipei (TW); Chien-Yun Hsu, New Taipei (TW); Po-Yi Lee, New Taipei (TW); Yu-Nan Lin, New Taipei (TW); Huei-Ting Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/482,928

(22) Filed: Apr. 10, 2017

(65) Prior Publication Data
US 2017/0344054 A1    Nov. 30, 2017

(30) Foreign Application Priority Data

May 30, 2016 (TW) .............................. 105116828 A
Aug. 26, 2016 (TW) .............................. 105213055 U (51) Int. Cl.
*H05K 7/00* (2006.01)
*H05K 5/00* (2006.01)
*G06F 1/16* (2006.01)

(52) U.S. Cl.
CPC ............ *G06F 1/162* (2013.01); *G06F 1/1637* (2013.01); *G06F 1/1681* (2013.01)

(58) Field of Classification Search
CPC ....................................................... G06F 1/16
USPC .................................................... 361/679.21
See application file for complete search history.

(56) References Cited

U.S. PATENT DOCUMENTS 7,583,500 B2 * 9/2009 Ligtenberg ............ G06F 1/1616
                                                                361/147
2010/0321877 A1 * 12/2010 Moser .................. G06F 1/1616
                                                                361/679.29

FOREIGN PATENT DOCUMENTS

TW      I 414929 B     11/2013
TW      I533105 B       5/2016

OTHER PUBLICATIONS

Chinese language office action dated Jan. 17, 2017, issued in application No. TW 105116828.

* cited by examiner

*Primary Examiner* — Jerry Wu
(74) *Attorney, Agent, or Firm* — McClure, Qualey & Rodack, LLP (57) ABSTRACT

An electronic device includes a display module, a movable member, a base, and a biasing element. The display module has a housing and a guiding member fixed thereto. The guiding member has an angled surface, and the housing has an opening. The movable member is disposed in the display module and has a through hole. The biasing element is disposed in the through hole and adjacent to the angled surface. The base has a main body and a connecting member, wherein the connecting member is connected to the main body and detachably connected to the display module. When the connecting member is inserted into the display module through the opening along a first direction, the connecting member pushes the movable member to move along a second direction with respect to the housing, and the movable member forces the biasing element to contact the connecting member.

10 Claims, 13 Drawing Sheets

ELECTRONIC DEVICE

CROSS REFERENCE TO RELATED APPLICATIONS

The present application is based on, and claims priority from, Taiwan Patent Application No. 105116828, filed on May 30, 2016, and Taiwan Patent Application No. 105213055, filed on Aug. 26, 2016, the disclosure of which is hereby incorporated by reference herein in its entirety.

BACKGROUND OF THE INVENTION

Field of the Invention

The application relates in general to an electronic device, in particular to an electronic device having a connecting member.

Description of the Related Art

Progress is constantly being made in the ongoing development of the technologies used in electronic devices. Conventional 2-in-1 laptop computers which can be assembled and used as a tablet computer or on a base are available on the market. To enhance the bonding strength between the base and the tablet computer, several protruding structures of considerable dimensions are provided on the base. However, these protruding structures are unaesthetic, and gaps may occur in the engagement mechanism, causing the connection between the tablet computer and the base to be loose. Moreover, the user may become injured by the protruding structures. For at least the reasons described above, how to design an electronic device to safely assemble the tablet computer with the base has become an important issue.

BRIEF SUMMARY OF INVENTION

To address the deficiencies of conventional electronic products, an embodiment of the invention provides an electronic device, including a display module, a movable member, a base, and a biasing element. The display module has a housing and a guiding member fixed thereto. The guiding member has an angled surface, and the housing has an opening. The movable member is disposed in the display module and has a through hole. The biasing element is disposed in the through hole and is adjacent to the angled surface. The base has a main body and a connecting member, wherein the connecting member is connected to the main body and detachably connected to the display module. When the connecting member is inserted into the display module through the opening along a first direction, the connecting member pushes the movable member to move along a second direction with respect to the housing, and the movable member forces the biasing element moving along the angled surface and toward a third direction to contact the connecting member.

In some embodiments, the connecting member has an engaging portion, and when the connecting member is inserted into the display module through the opening along the first direction, the engaging portion pushes the movable member.

In some embodiments, the engaging portion has a curved surface, and the engaging portion further has a trapezoidal structure and an extended structure connected to each other, wherein the curved surface is formed at an end of the extended structure.

In some embodiments, the display module further comprises an elastic element connected to the housing and the movable member, and when the movable member is moved along the second direction with respect to the housing, the elastic element is compressed by the movable member.

In some embodiments, the biasing element comprises a ball or a roller, and when the connecting member pushes the movable member to move along the second direction with respect to the housing, the biasing element rolls along the angled surface.

In some embodiments, the electronic device further comprises two biasing elements, the movable member further has two through holes with the biasing elements respectively disposed therein, and there is a distance between the biasing elements in the first direction.

In some embodiments, the first, second, and third directions are perpendicular to one another.

In some embodiments, the housing includes a fixed member and a frame, the frame can be rotated with respect to the fixed member, and the opening is formed on the frame.

Another electronic device is also provided in the invention, including a display module, a movable member, and a base. The display module has a housing and a guiding member fixed thereto. The guiding member has an angled surface, and the housing has an opening. The movable member is disposed in the display module and has a cantilever structure, wherein the cantilever structure is adjacent to the angled surface. The base has a main body and a connecting member, wherein the connecting member is connected to the main body and detachably connected to the display module. When the connecting member is inserted into the display module through the opening along a first direction, the connecting member pushes the movable member to move along a second direction with respect to the housing, and the cantilever structure is moved along the angled surface and toward a third direction to contact the connecting member.

In some embodiments, the cantilever structure is flexible, and when the connecting member pushes the movable member to move along the second direction with respect to the housing, the cantilever structure is bent toward the third direction.

In some embodiments, the housing includes a fixed member and a frame, the frame can be rotated with respect to the fixed member, and the opening is formed on the frame.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the electronic device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
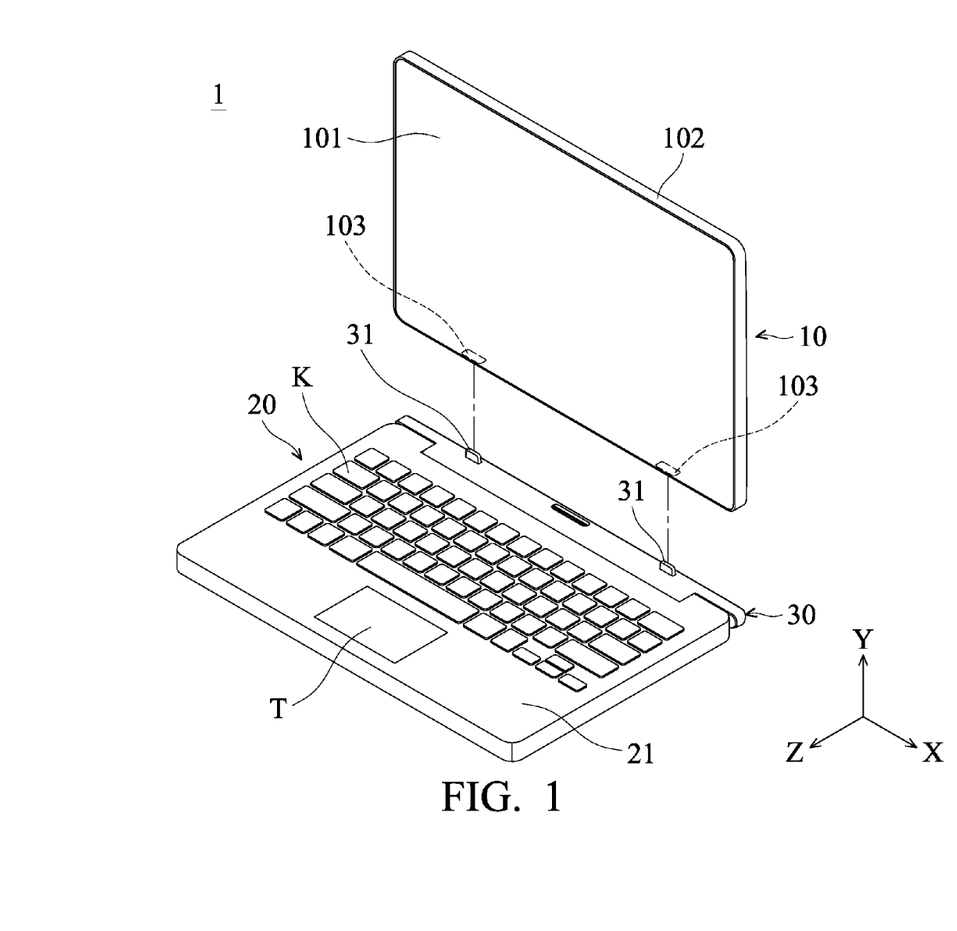
FIG. 1 is a schematic diagram of an electronic device according to an embodiment of the invention.

FIG. 1 is a schematic diagram of an electronic device 1 according to an embodiment of the invention. As shown in FIG. 1, the electronic device 1, such as a 2-in-1 laptop computer, primarily comprises a display module 10 and a base 20. The base 20 has a main body 21 and a connecting member 30 which is pivotally connected to the main body 21. The connecting member 30 is detachably connected to the display module 10, so that the display module 10 and the connecting member 30 are rotatable with respect to the main body 21 of the base 20. In the present embodiment, the main body 21 may be an input module which includes a keyboard K and a touch pad T. The bottom of the display module 10, as shown in FIG. 1, can be assembled to the base 20 by inserting engaging portions 31 of the connecting member 30 which are correspondingly inserted into openings 103 of the display module 10. Thus, the display module 10 and the base 20 can be used together as a laptop computer. The assembly and release mechanism between the display module 10 and the connecting member 30 of the electronic device 1 are described in detail below.

Figure 2A:
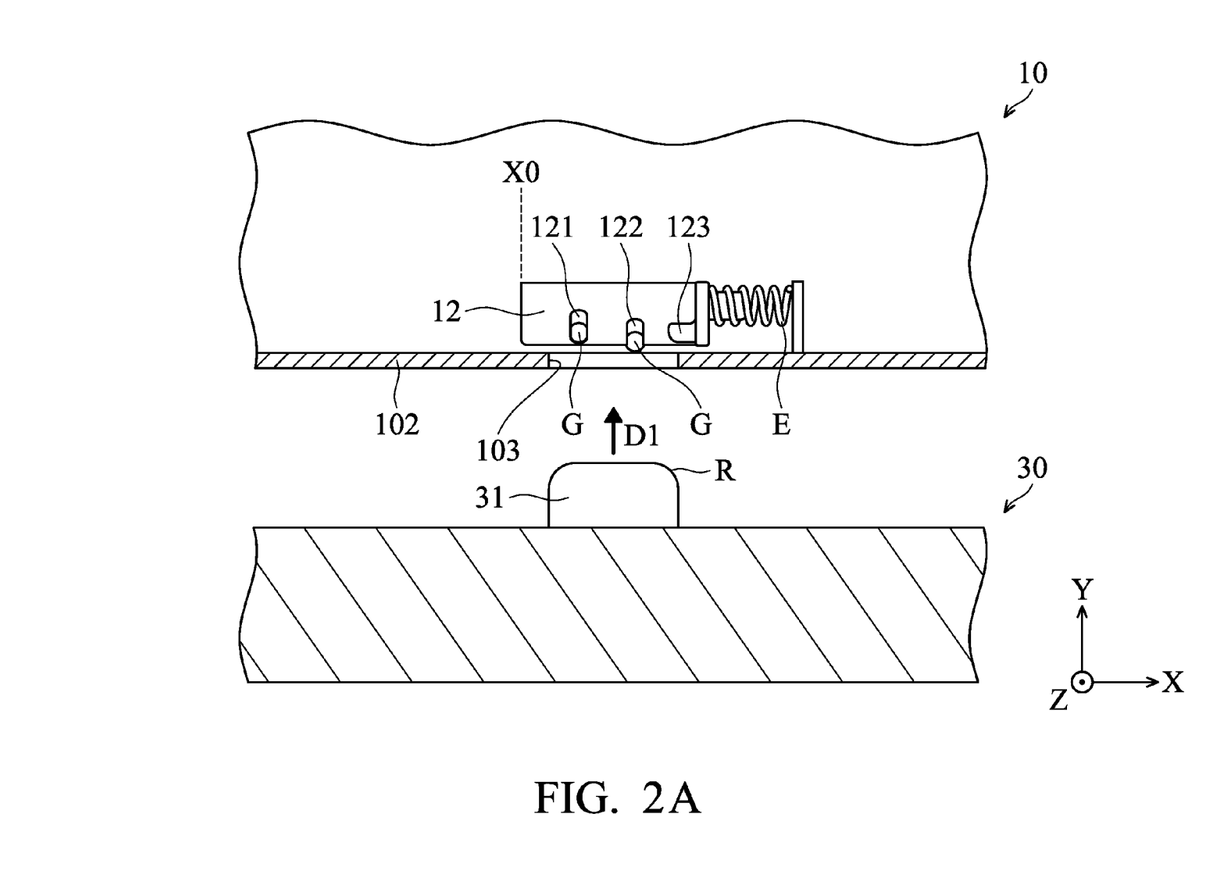
FIGS. 2A-2B are partial schematic diagrams of the display module before it is assembled to the connecting member in FIG. 1.
Figure 2B:
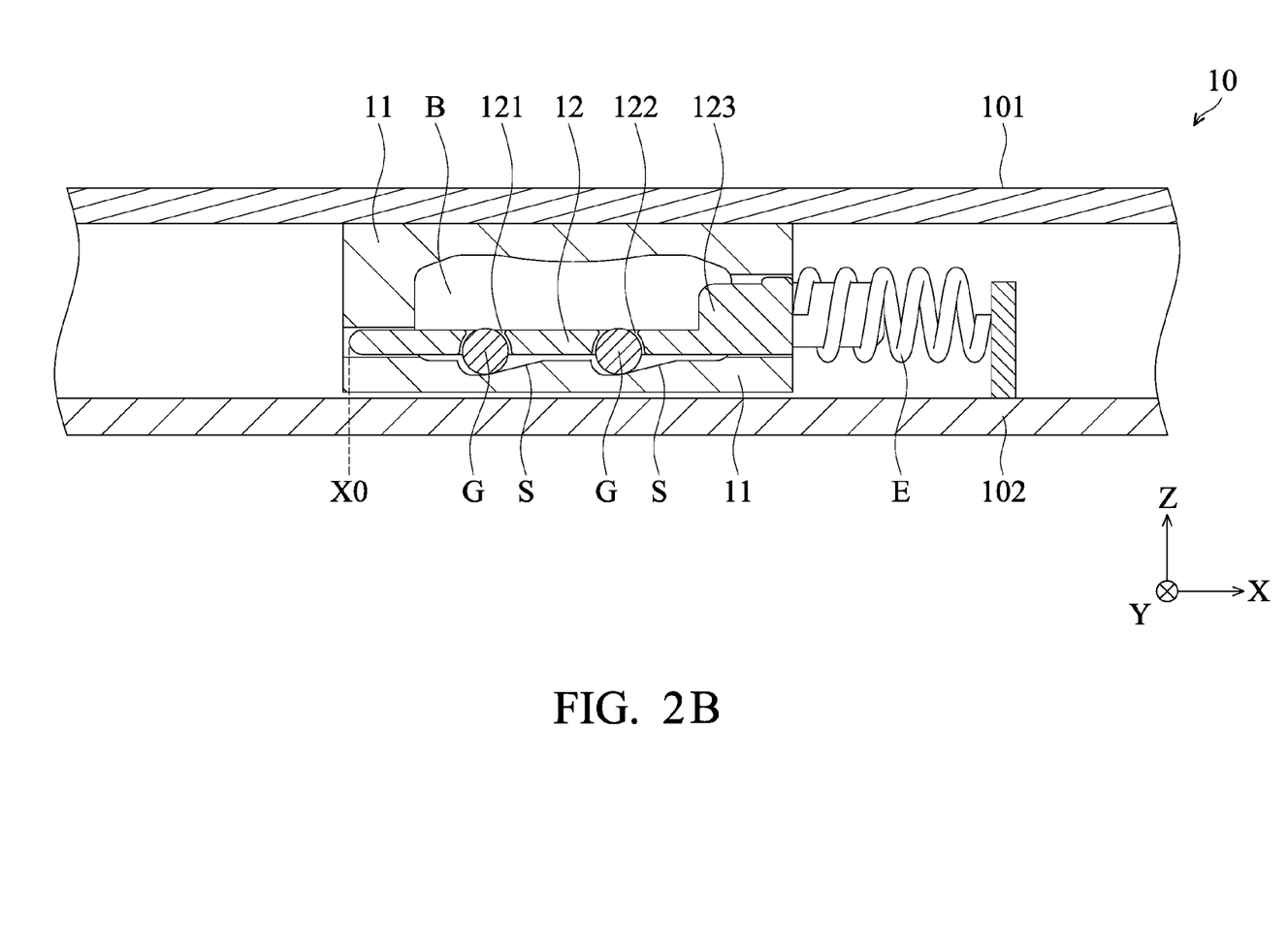
Figure 3A:
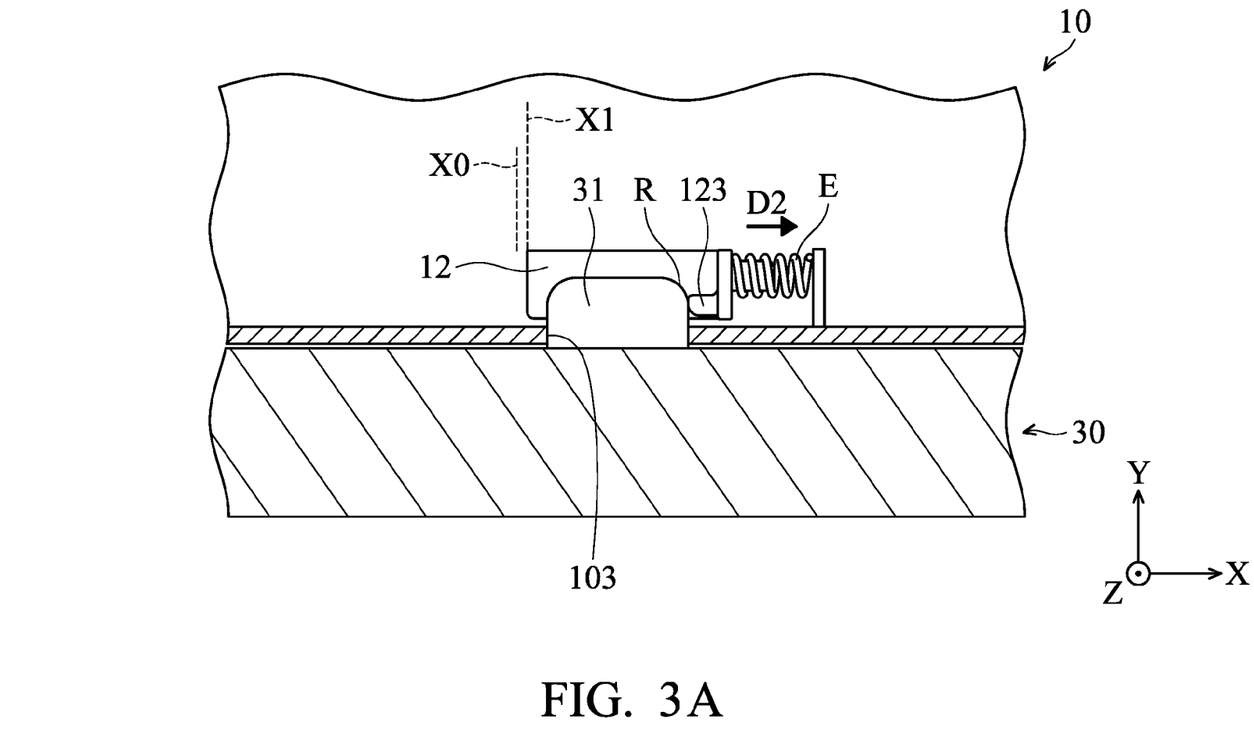
FIGS. 3A-3B are partial schematic diagrams of the display module after it is assembled to the connecting member in FIG. 2.
Figure 3B:
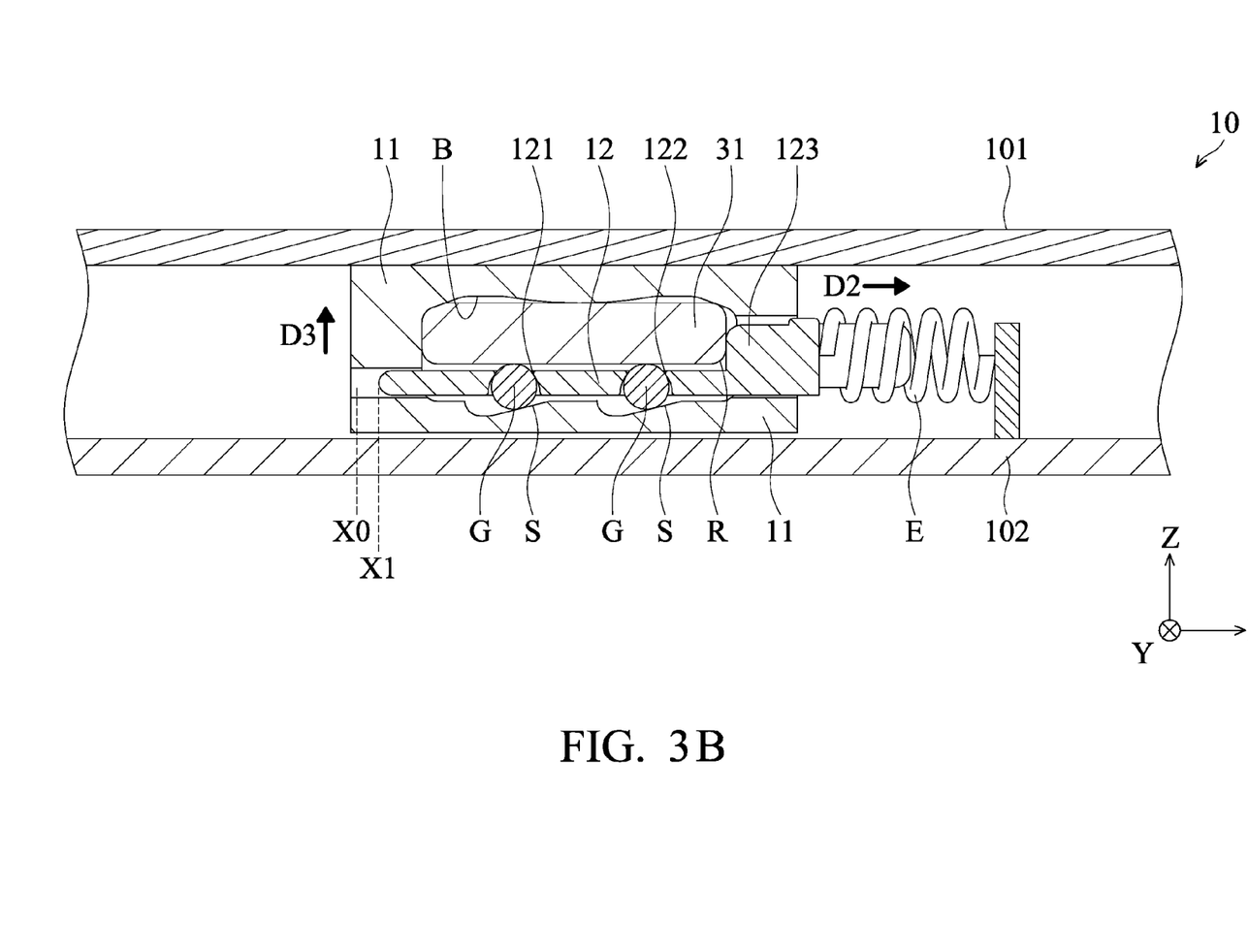

Referring to FIGS. 1 and 2A-2B, FIG. 2A is a partial sectional view of the display module 10 before it is assembled to the connecting member 30 (perpendicular to Z axis), and FIG. 2B is a partial sectional view of the display module 10 (perpendicular to Y axis). For the purpose of simplicity and clarity, the guiding member 11 is omitted from FIG. 2A. In FIGS. 1 and 2A-2B, the display module 10 has a display surface 101 and a housing 102, wherein an opening 103 is formed on the bottom of the housing 102, and the engaging portion 31 has a curved surface R. Furthermore, a movable member 12 and an elastic element E (such as a compression spring) are disposed in the display module 10, wherein the elastic element E is connected to the housing 102 and the movable member 12. As shown in FIG. 2B, a hollow guiding member 11 is disposed in the display module 10 and fixed to the housing 102, and the guiding member 11 has a receiving space B and an angled surface S with respect to the display surface 101. In the present embodiment, the movable member 12 has through holes 121 and 122 and two biasing elements G (such as balls or rollers) which are adjacent to the angled surface S, wherein those biasing elements G are disposed in the respective through holes 121 and 122.

Referring to FIGS. 2A-2B and 3A-3B, when the engaging portion 31 is inserted into the display module 10 through the opening 103 in a first direction D1 (FIG. 2A), the engaging portion 31 is received in the receiving space B, the curved surface R of the engaging portion 31 is in contact with a contact portion 123, and the engaging portion 31 pushes the movable member 12. Thus, the movable member 12 can be moved along a second direction D2 (FIGS. 3A-3B) with respect to the housing 102 and the guiding member 11 of the display module 10, from an initial position X0 to a predetermined position X1. It should be understood that the displacement of the movable member 12 causes compression of the elastic element E in the second direction D2, such that the biasing elements G are forced to move along the angled surface S (FIG. 3B), and the biasing elements G are lifted toward a third direction D3 to clamp the engaging portion 31. As a result, when the engaging portion 31 is inserted into the display module 10, the biasing elements G can tightly contact the engaging portion 31 by the pressing force from the movable member 12, so that the display module 10 can be firmly assembled to the base 20. When a user rotates the display module 10, the display module 10 may not be easily released or loosened from the connecting member 30. In the present embodiment, the first, second, and third directions D1, D2, and D3 are perpendicular to one another.

It should be noted that, in FIG. 2, there is a distance between the two biasing elements G in the first direction D1. When the biasing elements G contact the engaging portion 31, the engaging portion 31 is tightly and efficiently clamped by the two biasing elements G due to their different positions in the first direction D1 (Y axis). Therefore, the display module 10 can be stably assembled to the connecting member 30 to prevent loosening therebetween. In an embodiment, the guiding member 11 and the housing 102 may be integrally formed in one piece.

To detach the display module 10 from the connecting member 30, a force can be applied opposite to the first direction D1, so that the display module 10 is separated from the connecting member 30. Specifically, when the engaging portion 31 of the connecting member 30 is released from the opening 103 of the display module 10, an elastic recovery force is applied to the movable member 12 by the compressed elastic element E, so that the movable member 12 pushes the biasing elements G downward along the angled surface S (the direction of the −Z axis), and the movable member 12 returns from the predetermined position X1 to the initial position X0 in FIG. 2A.

Figure 4A:
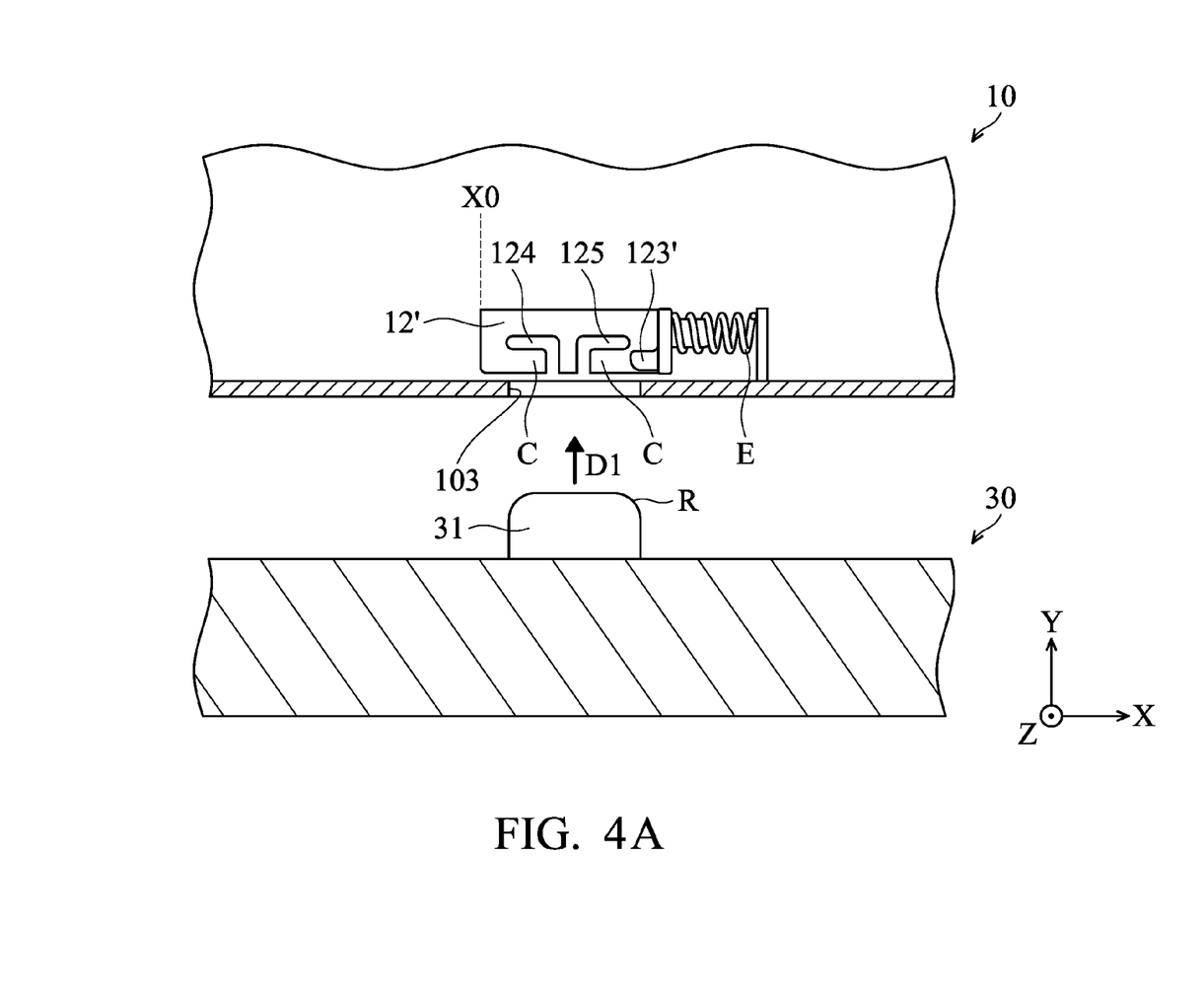
FIGS. 4A-4B are partial schematic diagrams of the display module after it is assembled to the connecting member according to another embodiment of the invention.
Figure 4B:
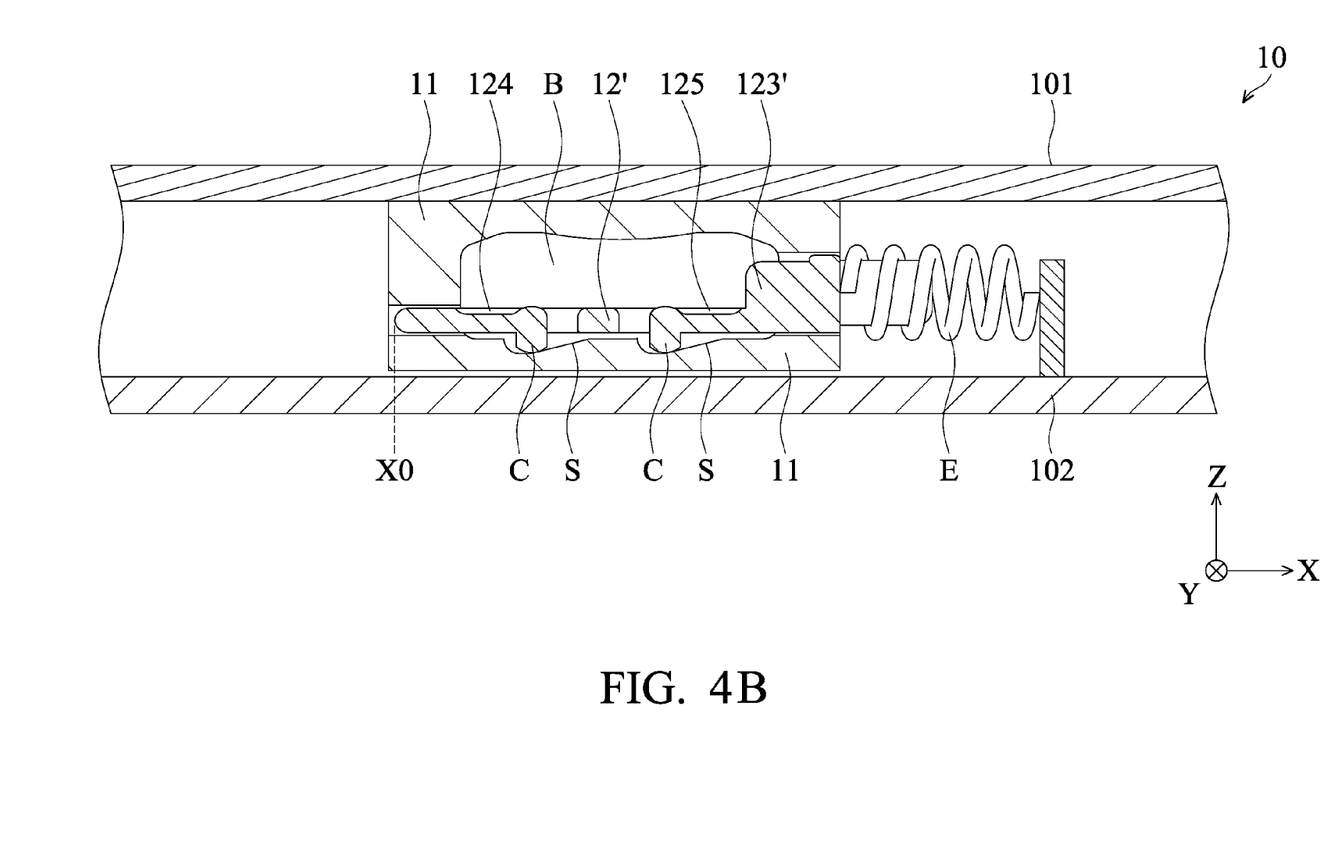
Figure 5A:
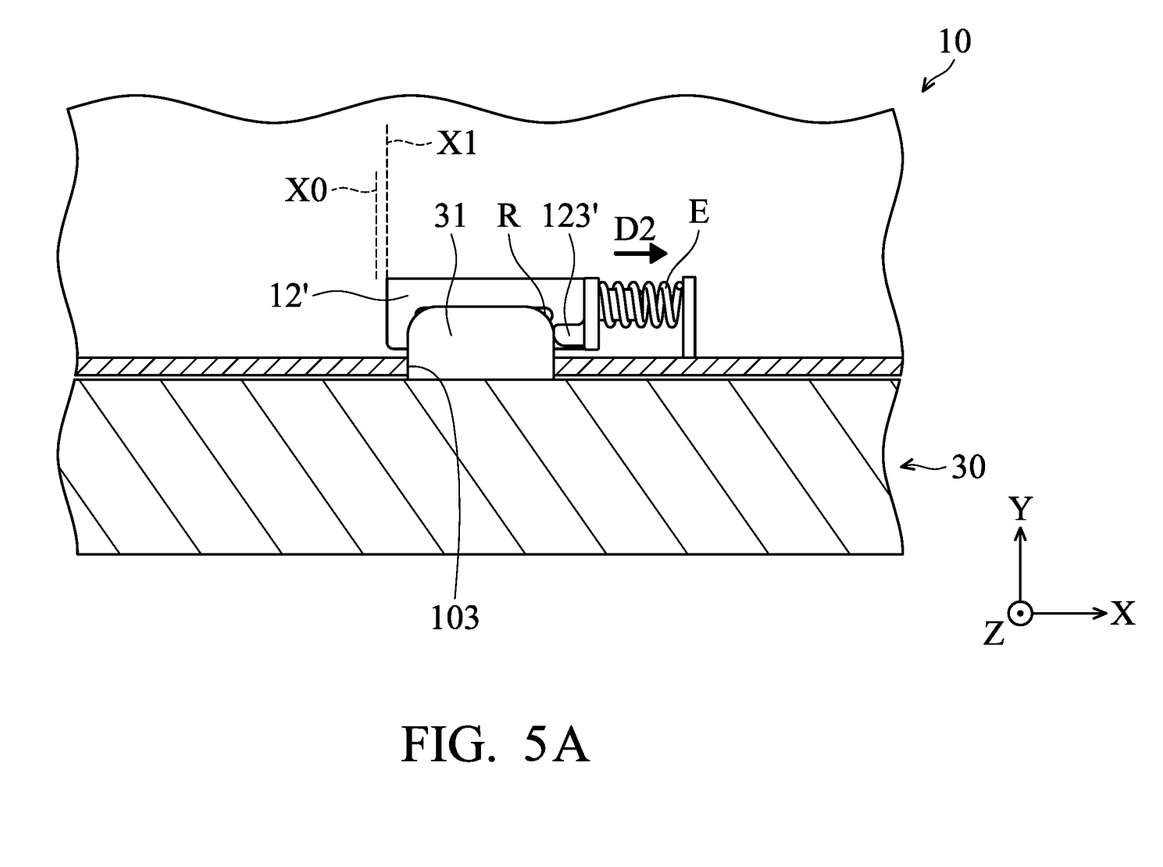
FIGS. 5A-5B are partial schematic diagrams of the display module after it is assembled to the connecting member in FIG. 4A.
Figure 5B:
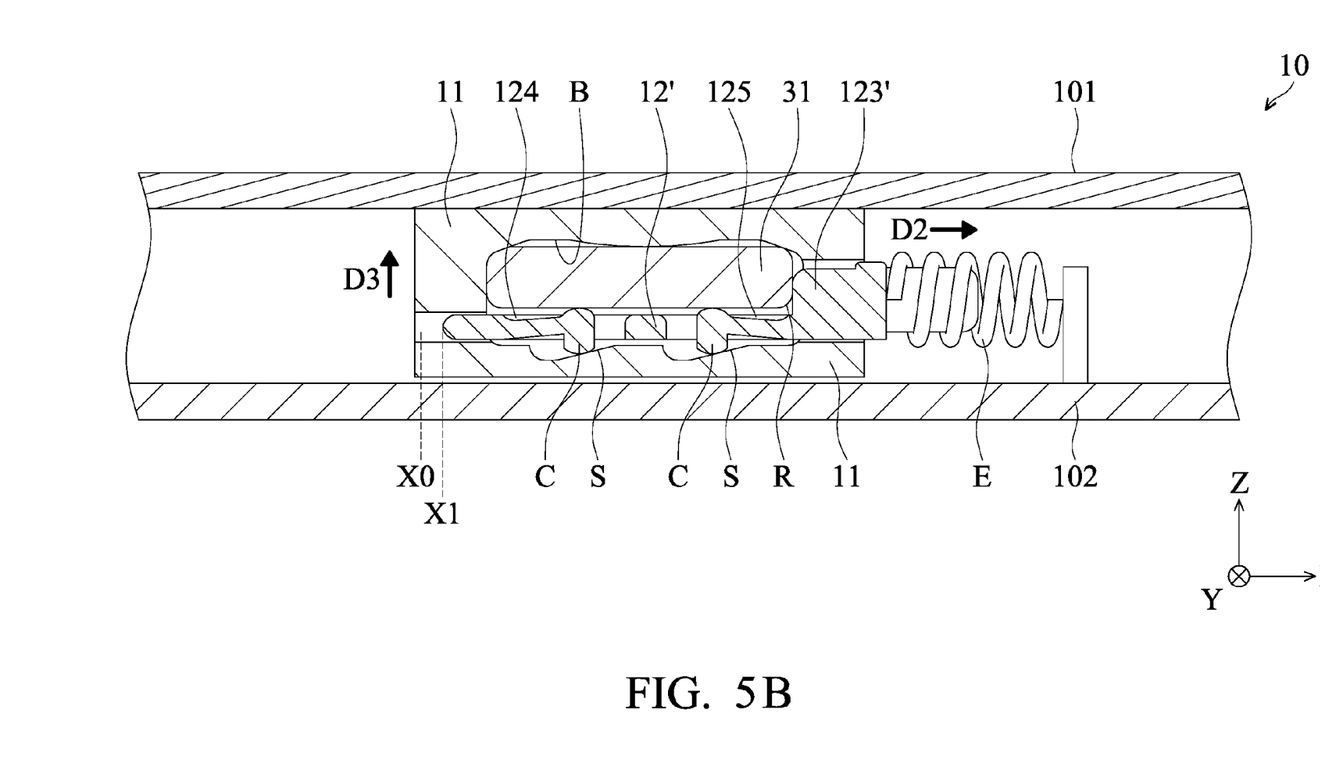

FIGS. 4A-4B and 5A-5B are partial schematic diagrams of the display module 10 after it is assembled to the connecting member 30 according to another embodiment of the invention. The main difference between the present embodiment and the aforementioned embodiment (FIGS. 2A-3B) is that the movable member 12' is different from the movable member 12, and there is no biasing element G in the present embodiment. As shown in FIGS. 4A-4B, the movable member 12' in the present embodiment has a pair of cantilever structures C and two L-shaped recesses 124 and 125 adjacent to the cantilever structures C, wherein the cantilever structures C are flexible and abut the angled surface S. When the engaging portion 31 is inserted into the display module 10 along the first direction D1 (FIG. 4), the curved surface R of the engaging portion 31 contacts a contact portion 123' of the movable member 12', and the engaging portion 31 pushes the movable member 12' to move from the initial position X0 to the predetermined position X1 (FIGS. 5A and 5B) along the second direction D2 (FIG. 5A). Meanwhile, the cantilever structures C are moved along the angled surface S and bent toward the third direction D3, to contact the engaging portion 31 toward the third direction D3 (FIG. 5B). Like the previous embodiment (FIGS. 2A-3B), as the cantilever structures C tightly contact the engaging portion 31, the display module 10 can be firmly fixed to the connecting member 30 of the base 20.

It should be noted further that the movable member 12 may only have one through hole 121 (or 122), and only one biasing element G is provided in the through hole 121 (or 121). The movable member 12' may also have only one cantilever structure C and one recess 124 (or 125), so as to save on materials and reduce the cost of assembly.

Figure 6A:
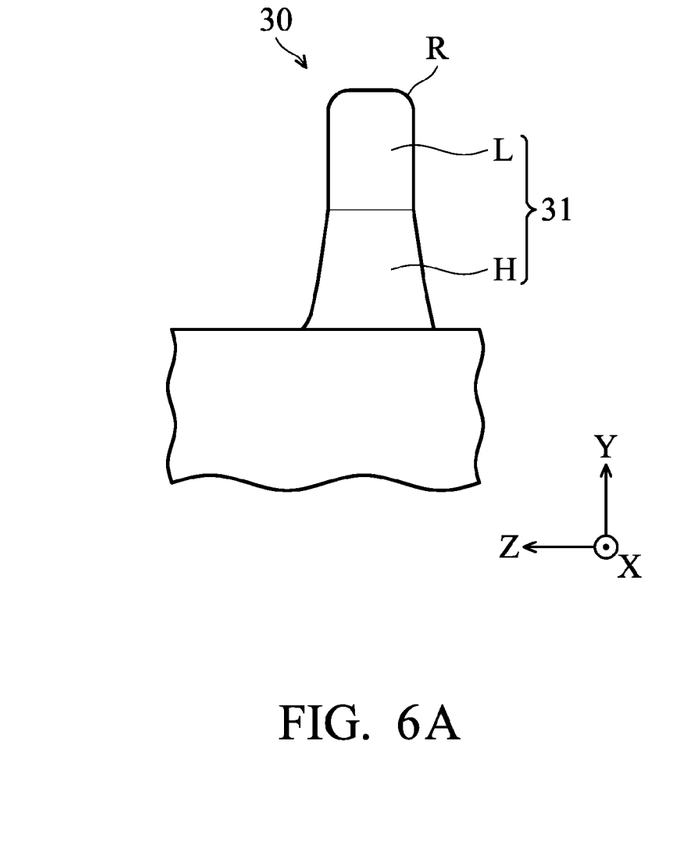
FIGS. 6A-6B are partial schematic diagrams of the connecting member.
Figure 6B:
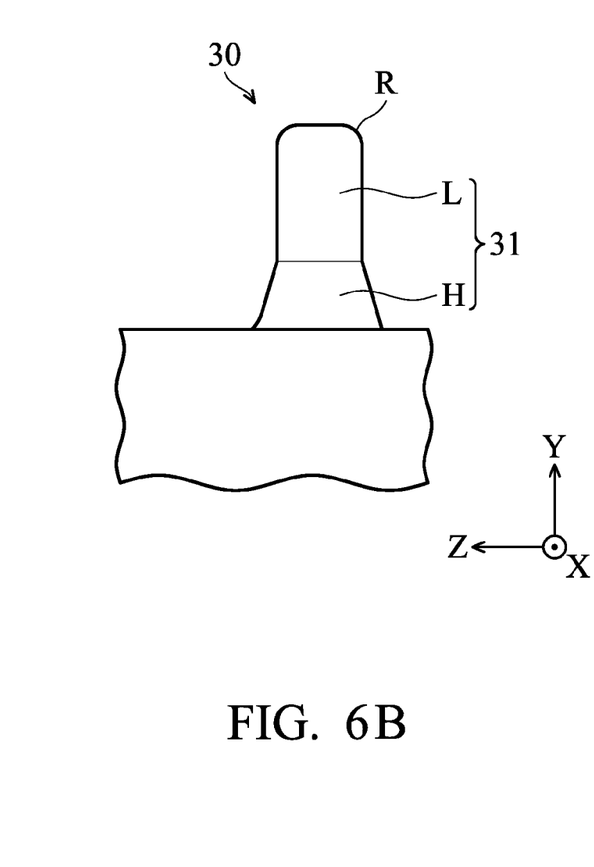

FIG. 6A is a partial schematic diagram (a side view) of the connecting member 30. As shown in FIG. 6A, the engaging portion 31 has a trapezoidal structure H and an extended structure L connected to each other. The curved surface R is formed at the end of the extended structure L, and the length of the trapezoidal structure H is approximately equal to the length of the extended structure L in the Y direction. Furthermore, the width of the extended structure L is less than that of the trapezoidal structure H in the Z direction, so that the engaging portion 31 can be easily inserted into the receiving space B through the extended structure L. Therefore, easy assembly of the display module 10 and the connecting member 30 can be achieved. Moreover, as shown in FIG. 6B, in another embodiment, the engaging portion 31 may have a longer-length extended structure L, wherein the length of the extended structure L is longer than the length of the trapezoidal structure H in the Y direction.

Figure 7:
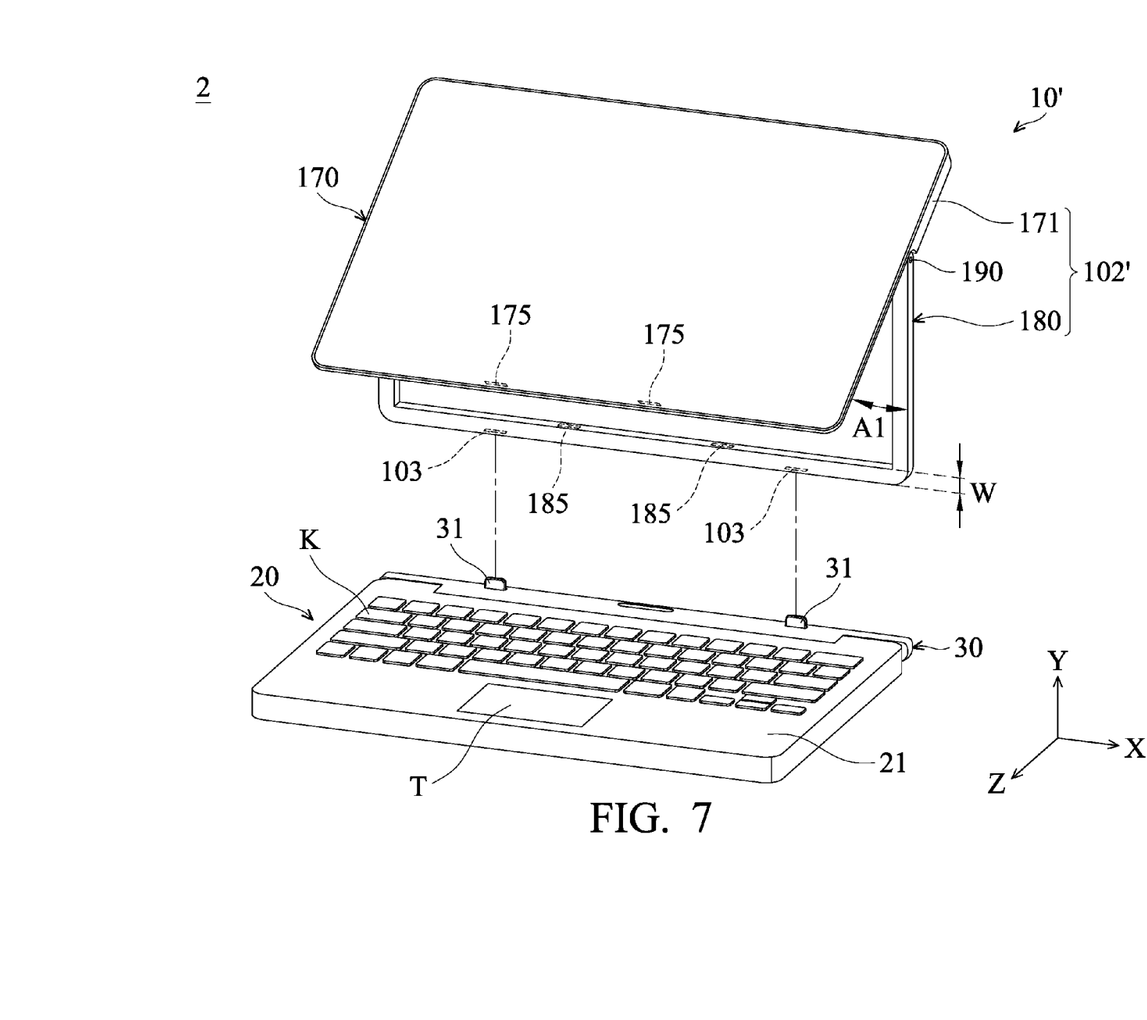
FIG. 7 is a schematic diagram of an electronic device according to another embodiment of the invention.

FIG. 7 is a schematic diagram of an electronic device 2 according to another embodiment of the invention. The main difference between the electronic device 1 (FIGS. 1 and 2A) and the electronic device 2 is that the housing 102' of the display module 10' in FIG. 7 includes a fixed member 171 and a frame 180. The fixed member 171 is fixed to a display unit 170 of the display module 10', and the frame 180 is pivotally connected to the fixed member 171 and the display unit 170. Thus, the display unit 170 and the fixed member 171 are rotatable with respect to the frame 180 to form an angle A1 therebetween (or the frame 180 is rotatable with respect to the display unit 170 and the fixed member 171 to form an angle A1 therebetween). As shown in FIG. 7, during assembly of the display module 10' and the base 20, the engaging portion 31 of the connecting member 30 is inserted into the opening 103 formed on the frame 180, and the frame 180 is rotatable with respect to the base 20 for viewing angle adjustment. It should be noted that, due to the small dimensions of the engaging portion 31, the width W of the frame 180 (in the Y direction) can also be reduced. Therefore, the dimensions of the electronic device 2 can be optimized and the aesthetic appearance can be improved. Specifically, the movable member 12 and the biasing elements G in FIGS. 2A-3B may be disposed in the frame 180 of FIG. 7, or the movable member 12' with the cantilever structure C in FIGS. 4A-5B may also be disposed in the frame 180 of FIG. 7 for robust assembly of the display module 10' and the base 20.

Figure 8:
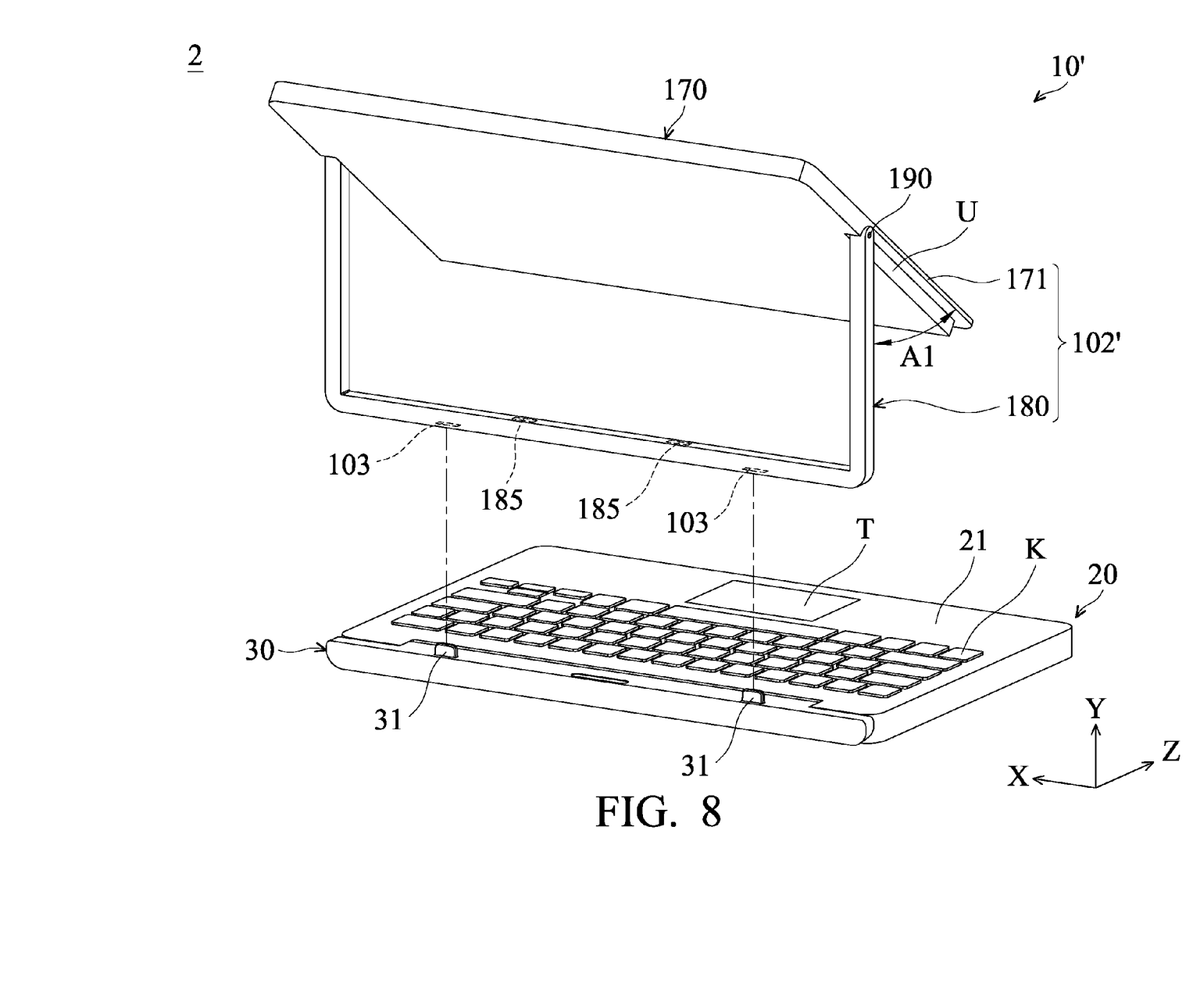
FIG. 8 is a rear perspective view of the electronic device in FIG. 7.
Figure 9:
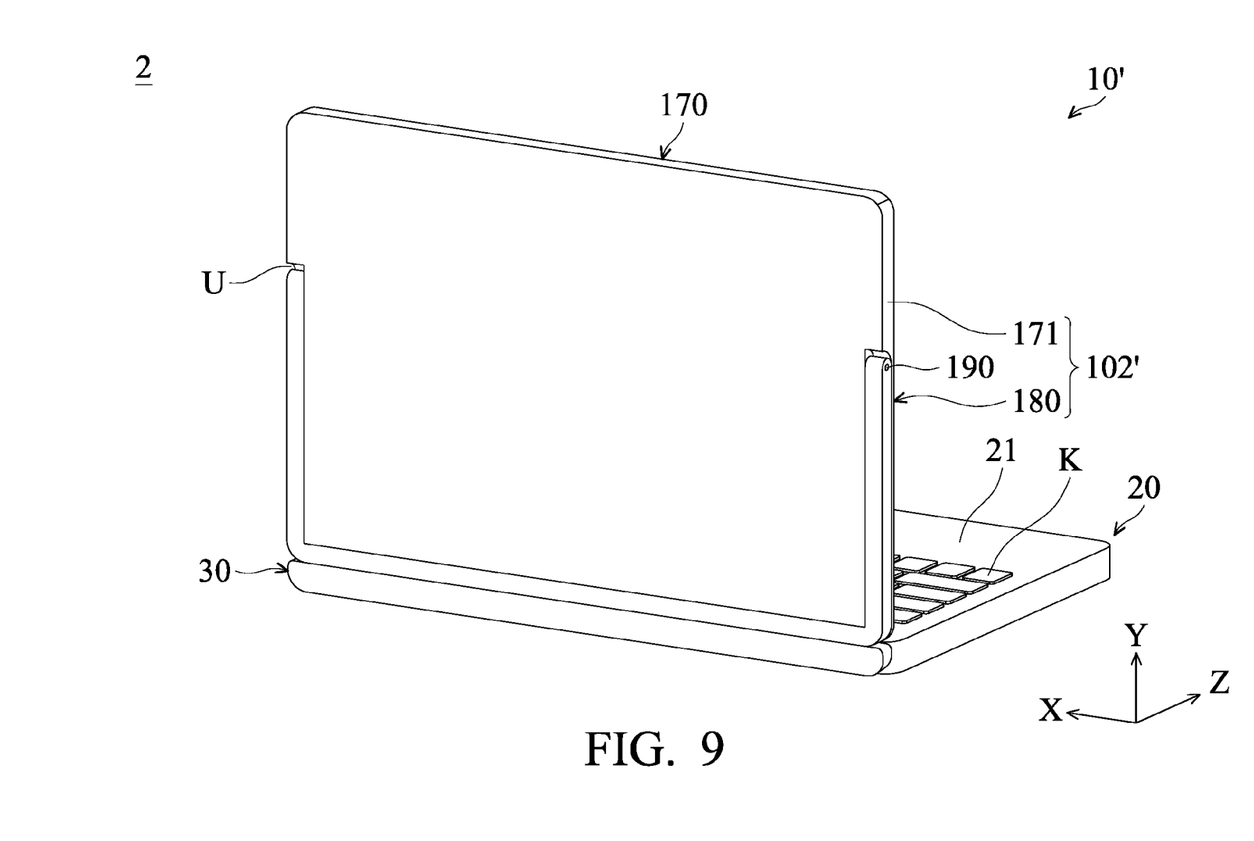
FIG. 9 is a schematic diagram of the frame is received in the U-shaped recess in FIG. 8.

FIG. 8 is a rear perspective view of the electronic device 2 in FIG. 7, wherein the electronic device 2 further comprises at least one hinge member 190, and the display unit 170 and the fixed member 171 are pivotally connected to the frame 180 by the hinge member 190 and are rotatable with respect to the frame 180 to form an angle A1 therebetween. Here, the maximum value of the angle A1 is about 150 degrees, and it depends on the positions and shapes of the fixed member 171 and the frame 180. However, the maximum value of the angle A1 may be more or less due to the different shapes and relative positions of the fixed member 171 and the frame 180. The fixed member 171 has a U-shaped recess U formed on the lateral and bottom sides of the rear surface. When the display unit 170 is unfolded with respect to frame 180, the frame 180 is received in the U-shaped recess U of the fixed member 171 (FIG. 9). In this way, the users would not see the frame 180 from the front side of the display unit 170. Thus, the aesthetic appearance of the electronic device 2 can be improved.

In FIG. 7, two first magnetic elements 175 are disposed in the fixed member 171, and two second magnetic elements 185 are disposed in the frame 180. The first and second magnetic elements 175 and 185, for example, are two magnets attracting each other. When the frame 180 is unfolded in the U-shaped recess U of the fixed member 171 (FIG. 9), the first magnetic elements 175 are respectively positioned corresponding to the second magnetic elements 185. Therefore, when the first and second magnetic elements 175 and 185 are close to each other due to rotation between the display unit 170 and the frame 180, accurate positioning between the frame 180 and the display unit 170 can be achieved by magnetic attraction between the first and second magnetic elements 175 and 185. In another embodiment, only one first magnetic element 175 and one second magnetic element 185 can be provided and disposed in the fixed member 171 and the frame 180, respectively.

In all the aforementioned embodiments, the engaging portion 31 may have a connector such as a male connector, and correspondingly, another connector such as a female connector may be in the opening 103. Thus, when the engaging portion 31 is inserted in the opening 103, the display module 10 (or 10') is electrically connected to the base 20. In another embodiment, a first connector such as a male connector is disposed on the connecting member 30 and outside the engaging member 31, and a second connector such as a female connector is disposed on the housing 102 (or the frame 180 of the housing 102') and outside the opening 103, so that the display module 10 (or 10') is electrically connected to the base 20, wherein no connector is disposed on the engaging member 31 or in the opening, and the dimensions of the first connector (male connector) are the same as or less than the dimensions of the engaging portion 31.

In summary, an electronic device is provided, comprising a display module, a base, and a movable member. At least one biasing element is disposed in the display module. The base has a connecting member, and the connecting member is detachably connected to the display module and has an engaging portion. With the biasing element is tightly in contact with the engaging portion, the bonding strength between the display module and the connecting member can be enhanced when the engaging portion is inserted into the display module, so as to prevent easy separation of the display module from the connecting member. Furthermore, as the dimensions of the engaging portion can be smaller than those of a traditional one, the aesthetic appearance of the electronic device can be improved, and users can be protected from being injured by touching the engaging member.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An electronic device, comprising: a display module, having a housing and a guiding member fixed thereto, wherein the guiding member has an angled surface, and the housing has an opening; a movable member, disposed in the display module and having a through hole; a biasing element, disposed in the through hole and adjacent to the angled surface; and a base, having a main body and a connecting member, wherein the connecting member is connected to the main body and detachably connected to the display module; when the connecting member is inserted into the display module through the opening along a first direction, the connecting member pushes the movable member to move along a second direction with respect to the housing, and the movable member forces the biasing element moving along the angled surface and toward a third direction to clamp the connecting member and secure the display module; wherein the first, second, and third directions are perpendicular to one another.

2. The electronic device as claimed in claim 1, wherein the connecting member has an engaging portion, and when the connecting member is inserted into the display module through the opening along the first direction, the engaging portion pushes the movable member.

3. The electronic device as claimed in claim 2, wherein the engaging portion has a curved surface, and the engaging portion further has a trapezoidal structure and an extended structure connected to each other, wherein the curved surface is formed at an end of the extended structure.

4. The electronic device as claimed in claim 1, wherein the display module further comprises an elastic element connected to the housing and the movable member, and when the movable member is moved along the second direction with respect to the housing, the elastic element is compressed by the movable member.

5. The electronic device as claimed in claim 1, wherein the biasing element comprises a ball or a roller, and when the connecting member pushes the movable member to move along the second direction with respect to the housing, the biasing element rolls along the angled surface.

6. The electronic device as claimed in claim 1, wherein the electronic device further comprises two biasing elements, the movable member further has two through holes with the biasing elements respectively disposed therein, and there is a distance between the biasing elements in the first direction.

7. The electronic device as claimed in claim 1, wherein the housing includes a fixed member and a frame, the frame is rotatable with respect to the fixed member, and the opening is formed on the frame.

8. An electronic device, comprising: a display module, having a housing and a guiding member fixed thereto, wherein the guiding member has an angled surface, and the housing has an opening; a movable member, disposed in the display module and having a cantilever structure, wherein the cantilever structure is adjacent to the angled surface; and a base, having a main body and a connecting member, wherein the connecting member is connected to the main body and detachably connected to the display module; when the connecting member is inserted into the display module through the opening along a first direction, the connecting member pushes the movable member to move along a second direction with respect to the housing, and the cantilever structure is moved along the angled surface and bent toward a third direction to clamp the connecting member and secure the display module; wherein the first, second, and third directions are perpendicular to one another.

9. The electronic device as claimed in claim 8, wherein the cantilever structure is flexible, and when the connecting member pushes the movable member to move along the second direction with respect to the housing, the cantilever structure is bent toward the third direction.

10. The electronic device as claimed in claim 8, wherein the housing includes a fixed member and a frame, the frame is rotatable with respect to the fixed member, and the opening is formed on the frame.

* * * * *